US005742803A

United States Patent [19]
Igarashi et al.

[11] Patent Number: 5,742,803
[45] Date of Patent: Apr. 21, 1998

[54] METHOD OF PERFORMING A COMPILATION PROCESS FOR DETERMINING A BRANCH PROBABILITY AND AN APPARATUS FOR PERFORMING THE COMPILATION PROCESS

[75] Inventors: Yutaka Igarashi; KohIchiro Hotta; Masakazu Hayashi; Manabu Matsuyama, all of Kawasaki, Japan

[73] Assignee: Fujitsu Limited, Kawasaki, Japan

[21] Appl. No.: 803,376

[22] Filed: Feb. 20, 1997

Related U.S. Application Data

[63] Continuation of Ser. No. 396,590, Mar. 1, 1995, abandoned, which is a continuation of Ser. No. 113,907, Aug. 31, 1993, abandoned.

[30] Foreign Application Priority Data

Mar. 8, 1993 [JP] Japan ................................ 5-045609

[51] Int. Cl.⁶ .................................................... G06F 9/00
[52] U.S. Cl. ................................... 395/580; 395/586
[58] Field of Search .............................. 395/580, 586, 395/582, 584, 587

[56] References Cited

U.S. PATENT DOCUMENTS

| | | | |
|---|---|---|---|
| 4,755,966 | 7/1988 | Lee et al. | 395/375 |
| 4,860,203 | 8/1989 | Corrigan et al. | 364/300 |
| 5,127,092 | 6/1992 | Gupta et al. | 395/375 |
| 5,179,680 | 1/1993 | Colwell et al. | 364/DIG. 1 |
| 5,202,995 | 4/1993 | O'Brien | 395/700 |
| 5,212,794 | 5/1993 | Pettis et al. | 395/700 |
| 5,230,050 | 7/1993 | Iitsuka et al. | 395/700 |
| 5,333,280 | 7/1994 | Ishikawa et al. | 395/375 |
| 5,448,737 | 9/1995 | Burke et al. | 395/700 |
| 5,450,588 | 9/1995 | Hoxey | 395/700 |
| 5,452,457 | 9/1995 | Alpert et al. | 395/700 |

OTHER PUBLICATIONS

Superscalar Microprocessor design by Mike Johnson, 1991 Prentice Hall publication, pp. 181–192, 205–212.
A VLIW Architecture for a Trace Scheduling Compiler by Colwell et al., IEEE 1988 publication.

*Primary Examiner*—Krisna Lim
*Assistant Examiner*—Zarni Maung
*Attorney, Agent, or Firm*—Staas & Halsey

[57] ABSTRACT

When a flow graph is created for a program including a complex if statement, the respective branch conditions in the complex if statement are separated and the flow graph designating the control flow corresponding to the logical value of respective branch conditions are created. Next, to perform the branch probability determining/allocating process, in the above flow graph, the value corresponding to the number of executions of respective paths is calculated so that the whole branch probability of the complex if statement designated by the optimization designating statement and the branch probability of respective branch conditions is assigned to the path corresponding to respective branch conditions.

13 Claims, 11 Drawing Sheets

```
if(A‖B‖C)
    xx;
else
    yy;
zz;
```
PROGRAM 101
Fig. 1A
PRIOR ART
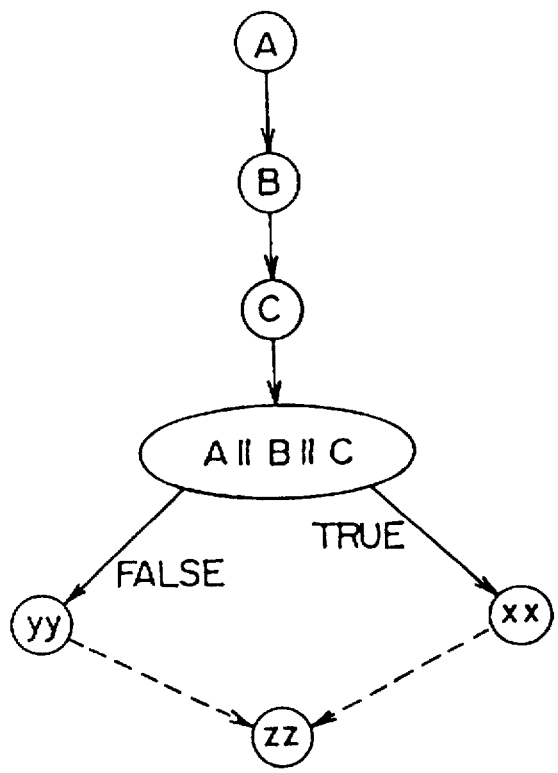
Fig. 1B
PRIOR ART
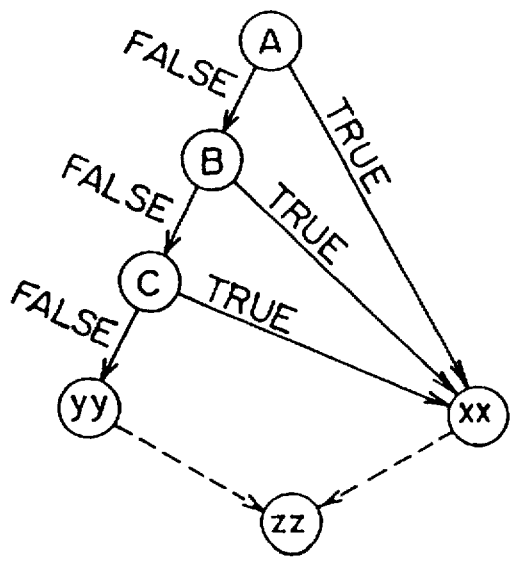
Fig. 1C
PRIOR ART Fig. 3A
```
#pragma statement if 40
if((A||B) && C && (D||E))
    xx;
zz;
```
PROGRAM 301
Fig. 3B
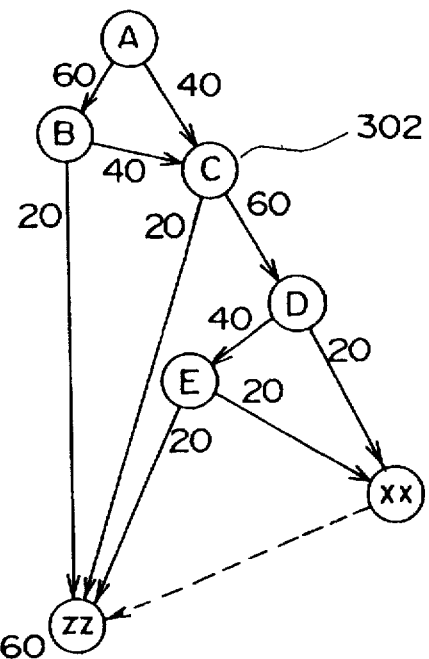
Fig. 3C
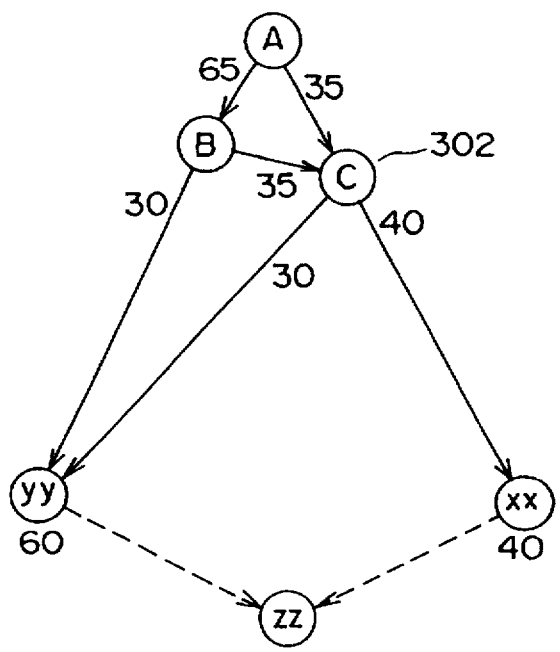

| POINTER TO A LIST DESIGNATING A PARENT BLOCK |
|---|
| POINTER TO A LIST DESIGNATING A CHILD BLOCK |
| POINTER DESIGNATING INSTRUCTION AT HEAD OF THE BLOCK |
| POINTER DESIGNATING INSTRUCTION AT END OF THE BLOCK |
| ATTRIBUTE AREA |

Fig. 8A

```
#pragma statement if(40,20,90,80,40)
 if((A || B) && C && (D || E))
     xx;
 else
     yy;
 zz;
```

PROGRAM 1001

Fig. 10

METHOD OF PERFORMING A COMPILATION PROCESS FOR DETERMINING A BRANCH PROBABILITY AND AN APPARATUS FOR PERFORMING THE COMPILATION PROCESS

This application is a continuation, of application Ser. No. 08/396,590, filed Mar. 1, 1995, now abandoned, which is a continuation of Ser. No. 08/113,907, filed Aug. 31, 1993, now abandoned.

BACKGROUND OF THE INVENTION

1. Field of the Invention

The present invention relates to a method of performing a compilation process to optimize execution speed of a program, by determining the branch probability of a branch statement in a program which includes a plurality of branch conditions, and further to an apparatus for performing the compilation process.

2. Description of the Related Art

Increasing the speed of a process of a computer system, is being sought a compiler for translating a program at a high execution efficiency has been demanded. Such a function of the compiler is called optimization.

A VLIW (very long instruction word) computer capable of executing a plurality of instructions in parallel by merely designating a single long instruction word at every instruction execution cycle has been recently noted.

When a program to be executed by the VLIW computer is compiled, a plurality of instructions able to be executed in parallel, because they do not share an arithmetic operating unit or data path and do not require any results of operations performed by the other instructions, may be designated by a single long instruction word. As a result, optimization is achieved. By performing such optimization, the rate of executing respective instructions of a program to be performed in parallel can be increased and the execution time of a program can be shortened.

The above technical background requires technology for performing the compilation, and detecting, from a program to be processed a plurality of instructions, able to be executed in parallel, because they do not share an arithmetic operating unit or a data path and do not require any results of operations by the other instructions.

Generally speaking, when a branch instruction exists in the program which is compiled, an instruction succeeding the branch instruction is not always executed depending on the branch condition. Therefore, it is desired quite often to detect a plurality of instructions executable in parallel with a group of instructions, allocated between two branch instructions called a basic block. However, an optimization performed for respective basic blocks, merely enables, at maximum, two instructions to be executed as a result of a statistical average.

Effective methods for solving such a bottleneck have been proposed. (see, e.g., a method described as trace scheduling by J. R. Ellis, *Bulldog: A Compiler for VLIW Architecture*, the MIT Press, 1986).

According to the trace scheduling method, a train of instructions (called trace), which have many execution times, is detected in a program the instructions in the trace are sorted and parallelized to enable the trace to be executed with high efficiency. In this case, when a loop instruction appears the number of repetitions of the loop is determined, similarly, when a branch instruction appears, the probability of each branch is obtained. Based on the number of repetitions in the loop and the branch probability, a path with a large number of executions is selected and a particular trace is selected. Thus, a plurality of instructions can be executed in parallel by using units of the trace which overrides a plurality of basic blocks and has a larger number of executions. Consequently, the ratio of instructions executable in parallel can be increased and the execution speed of the program can be improved.

Therefore, it is very important to obtain the number of repetitions of a loop instruction and a branch probability of the branch instruction.

Additionally, it is useful to obtain the probability of the branch instruction.

Namely, for example, the branch probability of each branch instruction is necessary to detect a path with a high execution frequency when an optimization is performed, to enable the resources, such as a register, to be assigned with a high priority to a path having a higher execution frequency when performing the compilation.

When a branch instruction, occurs the execution cost becomes higher than if it were not chosen. The execution time becomes longer, as compared to the case of non-occurrence of the branch, because an instruction cycle for setting a branch target address in a program counter is added when a branch occurs.

Therefore, if the probability of the occurrence of the branch at the branch instruction greatly exceeds 50 percent, the logic of the branch condition is reversed and the instruction train to be executed, in the case of the occurrence of the branch, is replaced by the instruction train to be executed when the branch does not occur to shorten the execution time statistically. When the necessity of the above replacement, is to be determined the branch probability of the branch instruction may also be required.

Further, in order to shorten the time required for the compilation to perform an optimization, the level of optimization may be lowered for a path having a low frequency of execution. In such a case, a branch probability of the branch instruction may be required to determine the execution frequency of respective paths. For conventional optimization in a compilation process, the number of repetitions of the loop instructions is frequently shown in a source program and can be obtained with relative ease.

In contrast, the branch probability of the branch instruction can be determined for each respective branch instructions by the branch instruction being designated in the source program by a programmer or by using an automatic profile function resident in the computer system. The automatic profile function can measure the execution ratio of an instruction by compiling the program without performing the optimization.

When the branch instruction includes only a branch condition, the execution frequency of a path corresponding to the branch instruction can be determined immediately after the branch probability is determined.

In contrast, the prior art of a compilation process accompanied by an optimization when the branch instruction includes a plurality of branch conditions will be explained by the following FIGS. 1A through 1C.

The program 101 shown in FIG. 1A is written in a C language. When one of the branch conditions A, B or C is true, a basic block xx in a THEN clause is executed (the word "THEN" is implicit), and if one of the branch conditions is not true, a basic block yy in an ELSE clause is executed and the basic block zz is executed after the completion of either of these clauses. A method of performing a compilation process in the following two cases (FIGS. 1B and 1C) has been known with regard to an IF statement, (which is called a complex IF statement) including a plurality of branch conditions in a statement representing one branch, as shown in this example.

As shown in FIG. 1B, in a first compilation process, the plurality of branch conditions A, B and C, are calculated as a group. This first compilation process is advantageous in that the branch probability of a complex IF statement can be determined with ease since the branch decision is performed at a single place. A document corresponding to this prior art, is known as "A Method of Selecting Instructions Provided with Conditions upon Executing the Instructions" disclosed in Japanese Patent Publication Tokkohei 1-42019.

However, in the prior art shown in FIG. 1B, the branch probabilities cannot be obtained for the respective branch conditions A, B and C. In the case of a basic block in which respective branch conditions A, B and C comprise a plurality of instructions, the first compilation process cannot achieve a precise optimization by selecting an optimum path from paths of the branches depending on respective branch conditions.

As shown in FIG. 1C, in the second compilation process, a decision involving a plurality of branch conditions is resolved into respective branch paths. Also, in the second compilation process, branch decisions are not performed at one place but are performed for respective branch conditions. Therefore, for example, when the branch condition A is true, the basic block xx in the THEN clause is immediately executed and the determination of the other branch conditions is not executed. Consequently, with regard to the same source program, an execution time of an executable program generated based on the compilation process shown in FIG. 1C is statistically shorter than that of the executable program generated based on the compilation process shown in FIG. 1B.

In the operations generated based on the compilation process shown in FIG. 1C, a branch decision is performed for individual branch conditions in a complex IF statement. Thus it is possible to perform a precise optimization by selecting an optimum path among the paths which are branched under the individual branch conditions.

Accordingly, it is important to know how to determine respective branch probabilities of the individual branch conditions based on the branch probability allocated for the whole complex if statement. However, the method of enabling determination of such branch probabilities is not known.

SUMMARY OF THE INVENTION

An object of the present invention residing in the above described background, is to enable the branch probabilities of the respective branch conditions to be allocated based on the branch probability allocated for the whole complex IF statement and to predict the frequency of the execution with high precision so that an executable program with high efficiency is created.

The present invention creates a flow graph, for the branch statement representing one branch including a plurality of branch conditions. This flow graph comprises nodes, representing basic blocks, including the respective branch conditions in the branch statement. The flow graph further comprises a node representing a basic block to be executed where the conditional decision results in the branch statement being true and a node representing a basic block to be executed where the conditional decision results in the branch statement being false. This flow graph can be created as block connection relation data (corresponding to the connection matrix table) having the connection relation between respective basic blocks as the elements.

The branch probability of the path between respective nodes can be calculated as the branch probability of the branch condition included with the basic block corresponding to the node from which the path is outputted, based on the number of paths between respective nodes, to satisfy the branch probability information designated for the whole branch statement.

According to the construction of the above present invention, it is possible to decrease the optimization level of the path to which the branch condition specifies branching to, when the path is determined to have a low execution frequency based on the branch probability.

According to the construction of the present invention, it is possible to allocate the branch probability information for each respective branch conditions in one branch statement, and to predict a frequency of the execution each respective instructions in the program with high precision when performing the compilation operation. The present invention may be applied to performing scheduling based on the frequency of execution of the respective instructions, such as the trace scheduling method. This thereby enables the compilation process, for translating the program, to be performed and the program to be operated with high efficiency.

BRIEF DESCRIPTION OF THE DRAWINGS

The other objects and features of the present invention can be easily understood by persons skilled in the art based on the description relating to the preferred embodiments of the present invention together with the attached drawings.

FIG. 1A shows an explanatory view of the prior art;

FIG. 1B shows an explanatory view of the prior art;

FIG. 1C shows an explanatory view of the prior art;

FIG. 3A shows an explanatory view of a second principle of the present invention;

FIG. 3B shows a second explanatory view of a second principle of the present invention;

FIG. 3C shows a third explanatory view of a second principle of the present invention;

FIG. 8A shows an explanatory view of the data structure of the basic block;

FIG. 10 shows an explanatory view of an operation of another embodiment of the present invention.

DESCRIPTION OF THE PREFERRED EMBODIMENT

Explanation of the Principle

The principle of the present invention will be explained.

Figure 2:
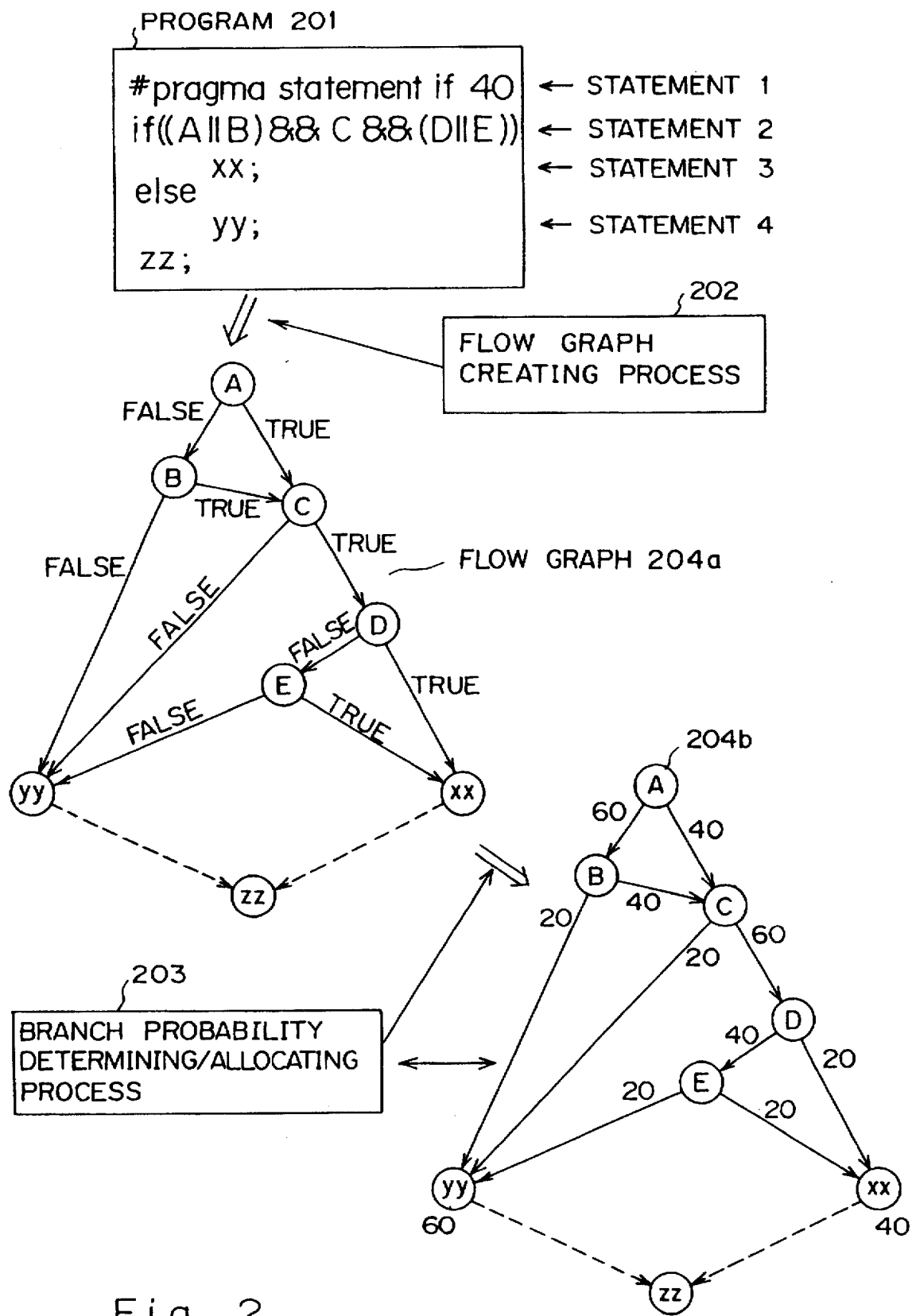
FIG. 2 shows an explanatory view of principle of the present invention.

In FIG. 2, program 201 is an example of a program subject to a compilation process. In program 201, statement 1 designates an optimization designating statement, statement 2 shows a complex IF statement, and xx in statement 3 represents a train of instruction statements which should be executed when the branch condition of the complex IF statement is true known as a THEN clause. (The word then THEN is implicit in the complex IF statement.) yy in statement 4 represents a train of instruction statements which should be executed when the branch condition of the complex IF statement is false, knows as an ELSE clause.

The branch conditions A, B, C, D and E, xx in the THEN clause and yy in the ELSE clause respectively comprise a continuous train of instructions which are stopped or branched therefore, this is called a basic block.

In the program 201, the optimization designating statement of statement 1 designates that the branch probability of the complex IF statement designated by statement 2, specifically, the truth probability in which the THEN clause designated by statement 3 (or xx) is executed, is 40 percent.

In flow graph creating process 202, designated by the following processes 1 and 2, with regard to program 201, a plurality of branch conditions A, B, C, D and E, in the complex IF statement designated by the statement 2, are not treated as a group. Instead individual branch conditions are separated, thereby creating a flow graph 204a which designates a control flow corresponding to the logical value of the respective branch condition.

Process 1: The complex IF statement designated by statement 2 is resolved into individual branch conditions. The THEN clause, ELSE clause and individual branch conditions are allocated with respective marks.

Process 2: Flow graph 204a is created for the branch conditions each allocated with the marks.

The flow graph 204a created by the above recited processes 1 and 2 is comprised of intermediate nodes A, B, C, D and E, respectively corresponding to branch conditions A, B, C, D and E; a final node xx, corresponding to the THEN clause xx; a final node yy corresponding to the ELSE clause yy; and paths connected between the respective nodes.

In the branch probability determining/allocating process 203, designated by the following processes 3 to 8, the values corresponding to the numbers of executions by respective paths are calculated. Consequently the whole branch probability (true ratio equals 40 percent) of the complex IF statement of statement 2 designated by the optimization designating statement of statement 1 is satisfied by the flow graph 204a. Branch probabilities of respective branch conditions are then assigned to the nodes corresponding to the respective branch conditions.

Process 3: The number of executions is allocated for final nodes xx and yy based on the designation by the optimization designating statement of statement 1. In the example shown in FIG. 2, the number of executions at node xx is allocated as 40 and the number of executions at node yy is allocated as 60.

Process 4: The respective numbers of paths input to respective nodes xx and yy are searched. In the example of FIG. 2, two paths are input to node xx and three paths to node yy.

Process 5: The numbers of executions at the respective nodes xx and yy are divided by the respective numbers of paths inputted to respective nodes. The respective results of the divisions are determined as the respective numbers of executions of respective paths input to the node. In the example of nodes xx and yy, the following allocation is performed.

The number of executions for the paths from node D to node xx is allocated as 40/2=20 (40 total executions at xx/2 paths inputting to xx).

Similarly the number of executions for the paths from node E to node xx is allocated as 40/2=20.

The number of executions for the paths from node B to node yy is allocated as 60/3=20 (60 total executions at yy/3 paths inputting to yy).

Similarly, number of executions for the paths from node C to node yy is allocated as 60/3=20.

Similarly again, the number of executions for the paths from node E to node yy is allocated as 60/3=20.

Process 6: For each intermediate node at which the numbers of the executions of all the paths output from intermediate node to other intermediate nodes is allocated, the sum of the numbers of the executions of all the outgoing paths is determined as the number of executions at the intermediate node. In the example shown above, the number of the executions for the paths from node E to node xx is 20, the number of the executions for the path from node E to node yy is 20, and the number of paths output from node E is only 2. Accordingly, the number of executions at node E is 20+20=40 (times). Then, the number of executions at the intermediate node, here node E, is divided by the number of paths input to the intermediate node, here node E, result of the division is determined to be the number of executions of each respective paths input to the intermediate node.

Process 7: The above process 6 is repeated for each intermediate node and thus the numbers of executions along all the paths are calculated. As a result, the flow graph 204b shown in FIG. 2 is obtained.

Process 8: The numbers of executions along the respective paths are respectively divided by the number of executions at the node from which respective paths are outputted, thereby calculating the branch probabilities of respective paths. For example, the branch probability from the node A to node C is 40/100 =0.4 and the branch probability from the node B to node C is 40/60=0.66.

By performing the above explained flow graph creating process 202 and branch probability determining/allocating process 203, the respective branch probabilities can be determined for respective branch conditions in a complex IF statement, thereby enabling precise optimization scheduling to be performed in a compilation process.

For example, performing a precise optimization based on the trace scheduling method, by selecting an optimum path with a high branch probability, from among paths branched under the individual branch conditions in the complex IF statement becomes possible.

Additionally, performing an optimization to allow resources, such as a register to be assigned with a high priority to the path with the higher branch probability from among all the paths branched under a respective branch conditions in the complex IF statement becomes possible.

When the branch probability of a path of a branch occurring under respective branch conditions in the complex IF statement exceeds 50 percent significantly, the logic of the branch condition may be reversed and the instruction train to be executed, when the branch occurs is replaced by an instruction train to be executed when the the branch does not occur, thereby shortening execution time statistically.

Time required for a compilation of the program is shortened by decreasing the optimization level of the path, determined to have a low execution frequency based on the branch probability allocated as described above. Conventionally, the optimization level is changed during a compilation process with regard to a specific program but the optimization level of the specific path in a single program is not changed based on the frequency of the executions. In order to perform the optimization, analysis the flow of control of the program and the flow of the data is necessary. The higher the level of optimization planned, the more precise an analysis is required, resulting in a longer time required for the compilation process. However, the path with a low frequency of execution is not executed frequently, as a result even if the optimization level is low for such a path, this does not contribute to an increase in the total execution time of the program. In some cases shortening the compilation time of the program is more beneficial than shortening the execution time of the program. Accordingly, the time required for the optimization process, which may be time-consuming, may be shortened by decreasing the optimization level of the path along with a low number of executions based on the allocated branch probability.

FIGS. 3A, 3B and 3C show explanatory view of another principle of the present invention.

The above explanation is applied to the case where the ELSE clause exists in the complex IF, respectively statement. As shown in a program 301 in FIG. 3A, the same explanation made above may be applied where the ELSE clause does not exist. In this case, the probability at which the node zz is executed is actually 100 percent. However the branch probability is calculated under the assumption that node zz is executed at a probability of 60 percent when the branch probability is calculated based on the principle recited above. As a result, as shown in a flow graph 302 in FIG. 3B, the numbers of executions travelling through respective paths are calculated and the branch probabilities of respective branch conditions are calculated.

In the example of the program 201 shown in FIG. 2, the branch conditions D and E are deleted and the control flow is changed when branch condition D is always true in the compilation process subject to the optimization. In this case shown in FIG. 3B, the control flow is examined immediately before the calculation of the branch probabilities. The the branch probabilities of respective branch conditions can be allocated correctly as shown in flow graph 303 in FIG. 3C.

Explanation of Preferred Embodiments

The preferred embodiments of the present invention based on the above described operational principle is now explained.

Figure 4:
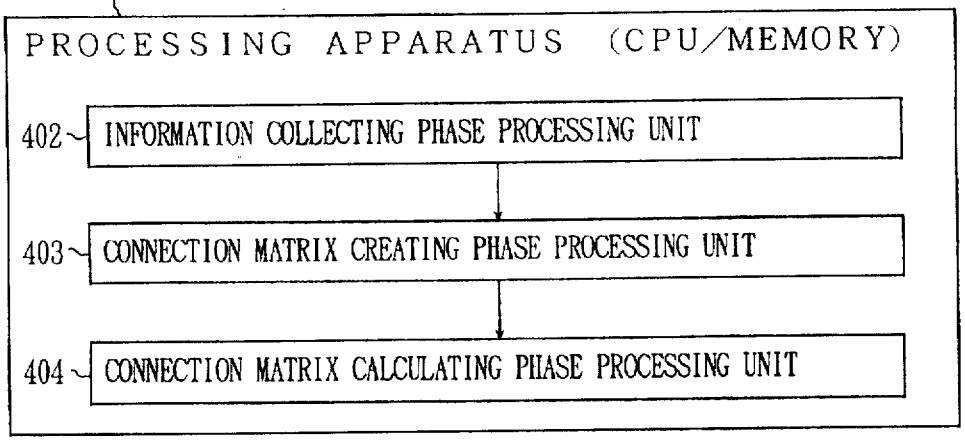
FIG. 4 shows a structural view of the preferred embodiment of the present invention.

FIG. 4 shows a structure diagram of a preferred embodiment of the present invention.

A processing apparatus 401, allocated with a CPU and memory, executes a compilation process.

An information collecting phase processing unit 402 executes a phase for collecting compilation information to create a flow graph.

A connection matrix creating phase processing unit 403 executes a phase for creating a connection matrix representing a flow graph.

A connection matrix calculating phase processing unit 404 executes a phase for calculating branch probabilities (truth ratio) using a connection matrix.

The above processing unit can be realized as a function of part of a compiler for executing the compilation process.

Figure 5:
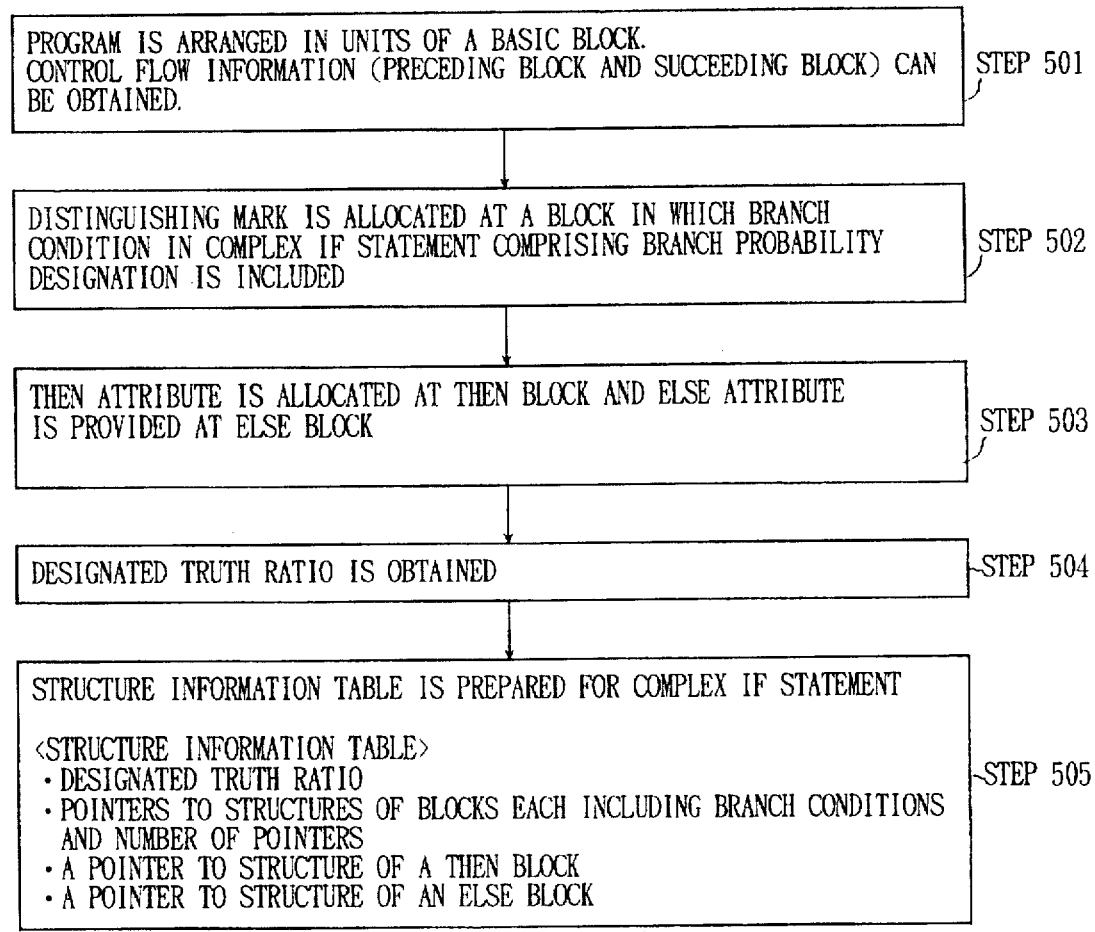
FIG. 5 shows an operational flowchart in the information collecting phase in the preferred embodiment of the present invention.
Figure 6A:
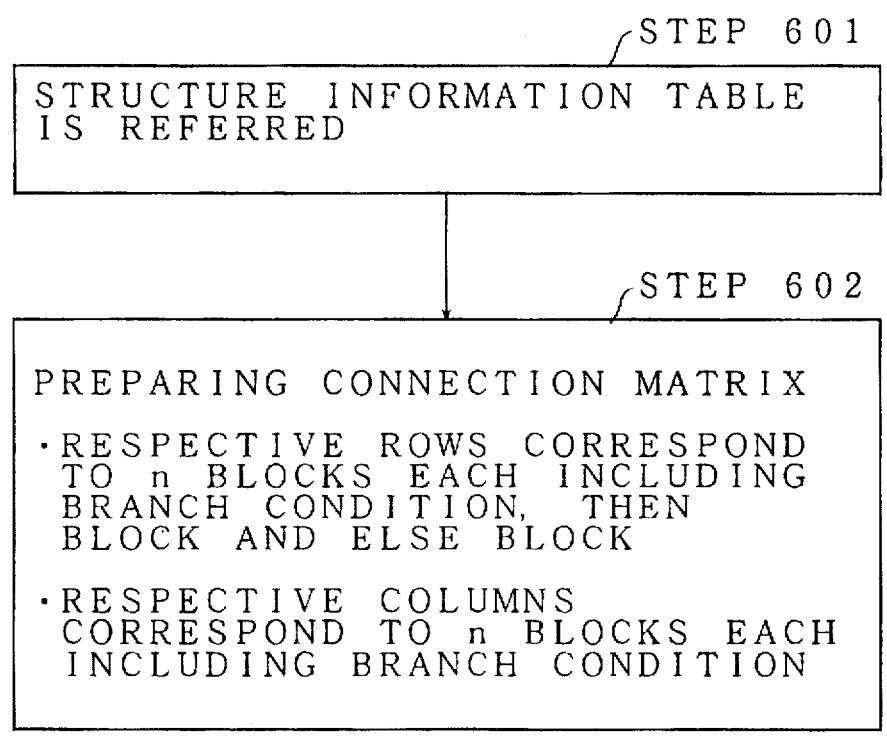
FIG. 6A shows one part of an operational flowchart in a connection matrix creating phase of the preferred embodiment of the present invention.
Figure 6B:
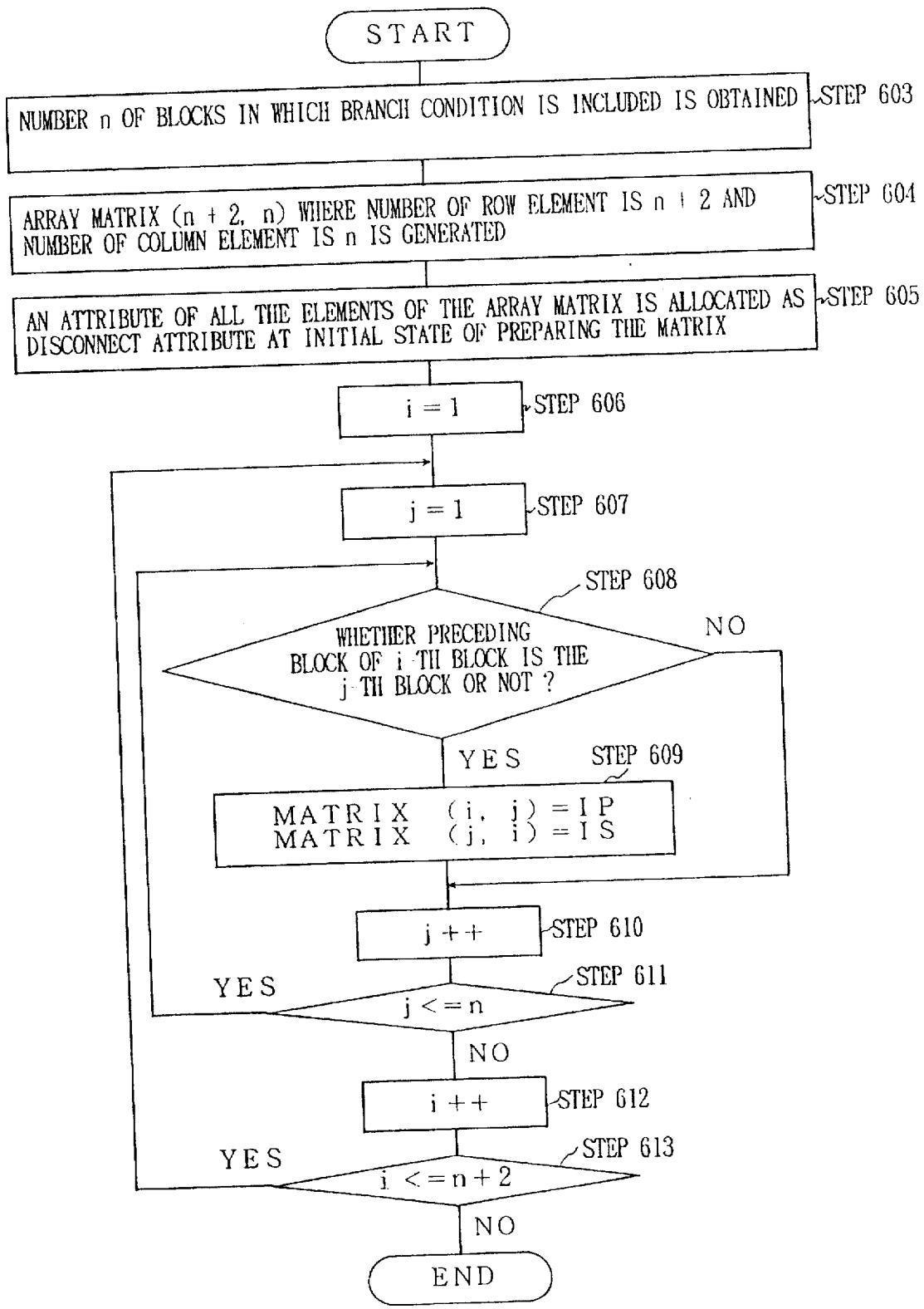
FIG. 6B shows the further part of the operation flowchart in a connection matrix creating phase of the preferred embodiment of the present invention.
Figure 7:
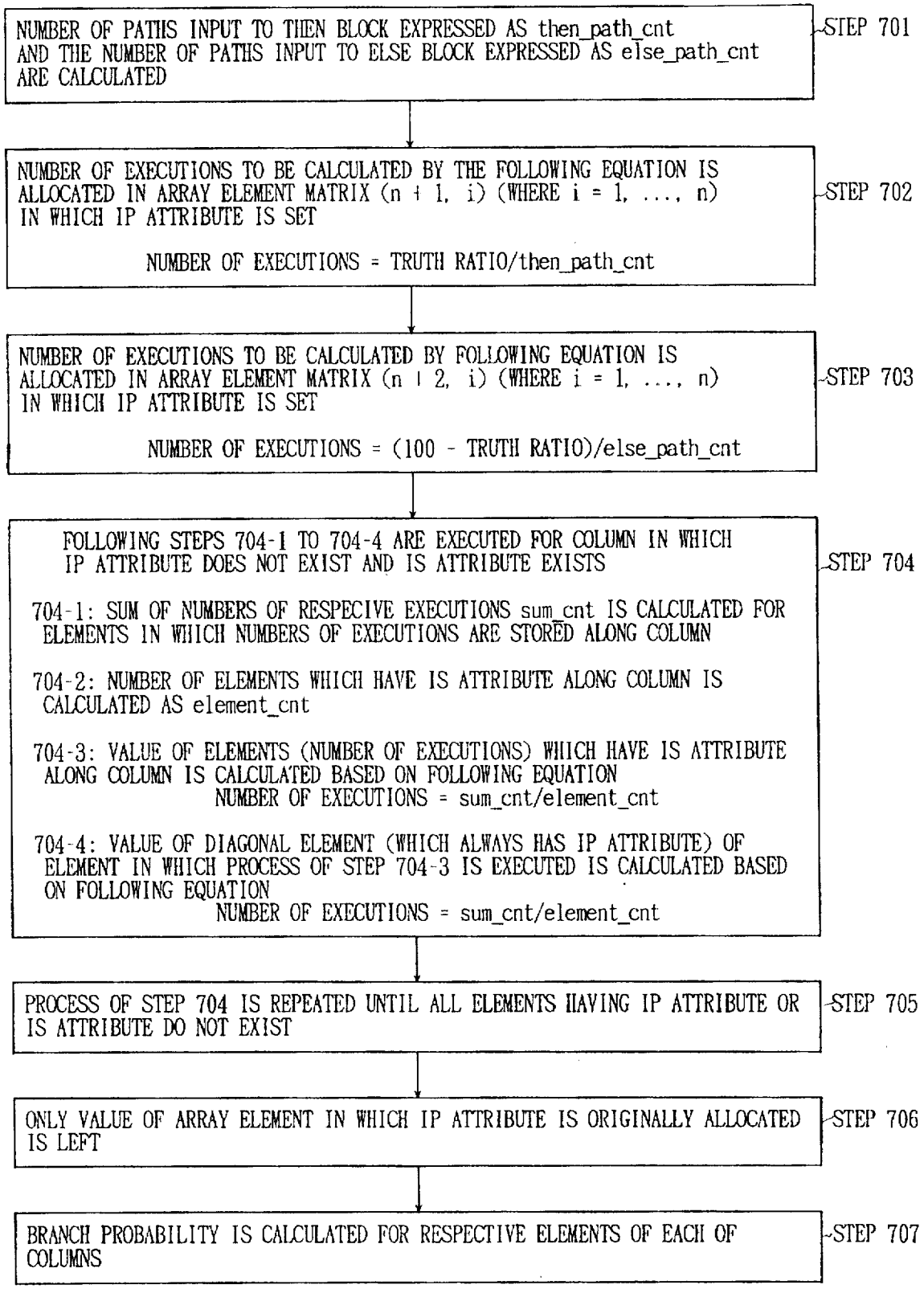
FIG. 7 shows an operational flowchart in the connection matrix calculating phase of the preferred embodiment of the present invention.
Figure 8B:
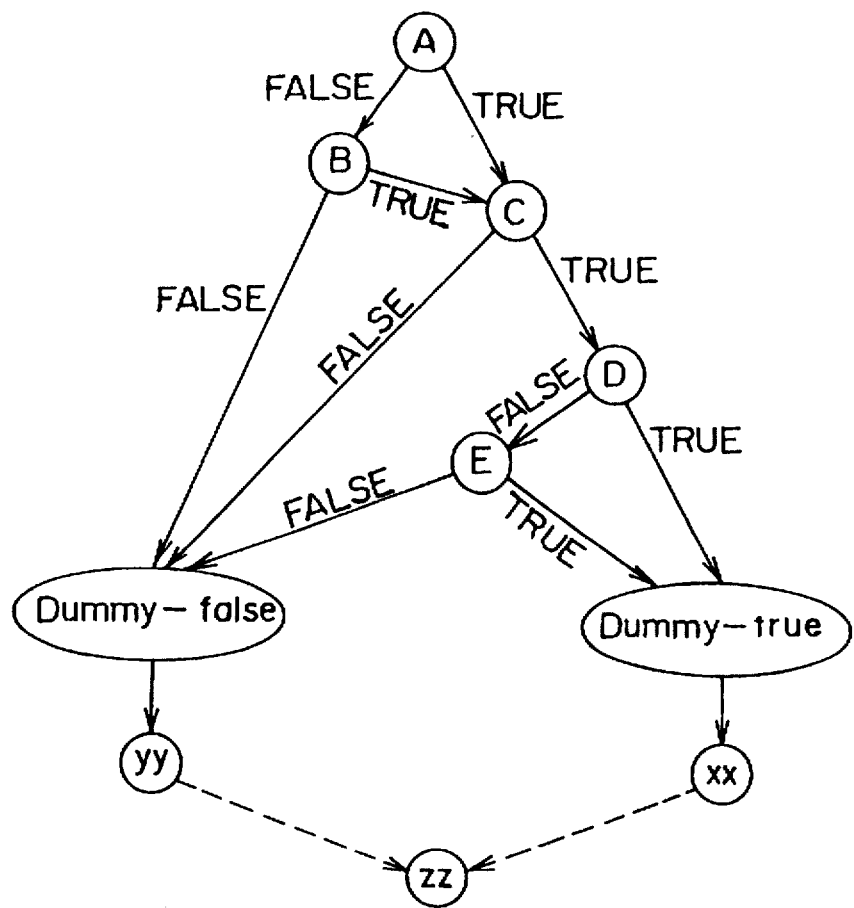
FIG. 8B shows an explanatory view of a dummy block.

The detail of the phase to be executed by the respective processing units is now explained according to the operational flowchart shown in FIGS. 5 to 7. FIG. 8A shows an explanatory view of the data structure of the basic block; FIG. 8B shows an explanatory view of the dummy block; and FIGS. 9A, 9B, 9C and 9D show a view of an example of the connection matrix.

Information collecting phase processing unit 402 executes the process of steps 501 to 505 designated by an operational flowchart shown in FIG. 5.

The program, which is converted to an intermediate code by structure analysis and semantics analysis in a compilation process, is arranged in units of a basic block (which is merely called a block hereinafter) with regard to respective blocks, control flow information concerning a preceding block and concerning a succeeding block of the respective blocks can be obtained.

FIG. 8A shows the data structure of a block (basic block). The block has the data structure comprising a pointer to a list designating a parent block, a pointer to a list designating a child block, a pointer designating an instruction at the head of the block, a pointer designating an instruction at the end of the block and an attribute area. Control flow information relating to the preceding block and the succeeding block of the particular block obtained in step 501 is allocated respectively as a pointer to a list designating the parent block and a pointer to a list designating the child block in the structure defining the particular block is shown in FIG. 8A.

In step 502 in FIG. 5, a distinguishing mark is allocated at a block in which the branch condition in the complex IF statement comprising the branch probability designation is included. The distinguishing mark distinguishes the complex IF statement, including the branch condition of the block at which the distinguishing mark is allocated and actually comprises a unique address or flag.

In step 503, a THEN attribute is allocated at a block representing a THEN clause (which is called a THEN block hereinafter) and an ELSE attribute is allocated to a block representing an ELSE clause (hereinafter called an ELSE block hereinafter).

A distinguishing mark, a THEN attribute or an ELSE attribute for a particular block allocated in steps 502 and 503 is allocated to an attribute area of the structure which defines the particular block shown in FIG. 8A.

Instead of allocating the attribute area in the structure of the block as shown in FIG. 8A, a branch condition of a complex IF statement and a dummy instruction representing a THEN clause or an ELSE clause (which is represented as dummy-true or dummy-false in FIG. 8B) may be inserted as the block as shown in FIG. 8B.

In step 504, a truth ratio of the branch probability of the complex IF statement designated by the optimization designating statement (statement 1 in FIG. 2, for example) is obtained.

In step 505, a structure information table is prepared for the complex IF statement. The structure information table includes the following information;

Designated truth ratio

Pointers to structures of blocks including branch conditions and the number of pointers A pointer to the structure of a THEN block A pointer to the structure of an ELSE block The above described process in the information collecting phase processing unit 402 corresponds to process 1, whereby the process is executed as part of the flow graph creating process 202 explained as the principle of the present invention by referring to FIG. 2.

Sequentially, the connection matrix creating phase processing unit 403 executes the processes shown in the operational flowcharts in FIGS. 6A and 6B.

As shown in step 601 in FIG. 6A, the information collecting phase processing unit 402 refers to the structure information table prepared in step 505 of FIG. 5. Step 602 creates a connection matrix having rows corresponding to n blocks, each including a branch condition, a THEN block and an ELSE block, and having columns corresponding to the n blocks, each including a branch condition with regard to each complex IF statement. For example, the connection matrix created from program 201 shown in FIG. 2 is reflected in FIG. 9A.

A block corresponding to a row in the connection matrix is called a row block and the block corresponding to a column is called a column block, and the portion where the row and the column intersect is called an element.

When the connection matrix is created in the step 602, as an initial state of the connection matrix, the respective elements of the connection matrix have been allocated with an IP attribute, IS attribute, or DISCONNECT attribute. The IP attribute designates that the column block corresponding to the element precedes the row block in the control flow the IS attribute designates that the column block corresponding to the element succeeds the row block in the control flow, and the DISCONNECT attribute designates that the column block corresponding to the element is not related to the row block corresponding to the element in the control flow. The DISCONNECT attribute is represented by mark X in FIGS. 9A to 9B.

A further detailed operational flowchart of the connection matrix creating process shown in step 602 is represented in FIG. 6B.

In step 603, the number n of blocks in which the branch condition is included is obtained.

In step 604, the array MATRIX (n+2, n), where the number of the row element is n+2 and the number of the column element is n, is generated. This array MATRIX represents a connection matrix.

In step 605, an attribute of all the elements of the array MATRIX is allocated as the DISCONNECT attribute at the initial state of preparing the array MATRIX.

Accordingly, the value of index i is incremented from 1 to n+2 by 1, in steps 606, 612 and 613 and the value of index j is incremented from 1 to n by 1 with regard to the value of indexes i in steps 607, 610 and 611, thereby repeating the execution of the following steps 608 and 609.

In step 608, it is determined whether the preceding block of i-th block is the j-th block. If the determination is YES, in step 609, the IP attribute is allocated at the array element MATRIX (i, j) and the IS attribute is allocated at the array element MATRIX (j, i).

Figures 9A, 9B:
FIG. 9A shows one view of the example of the connection matrix.
FIG. 9B shows a second view of the example of the connection matrix.

When the processes for all the array elements are completed, the connection matrix creating phase processing unit 403 has completed its operation. As a result, an array MATRIX (n+2, n) corresponding to the connection matrix shown in FIG. 9A is obtained.

The process performed by the connection matrix creating phase processing unit 403 corresponds to the process 2, executing as part of the flow graph creating process 202 in the explanation of the principle of the present invention by referring to FIG. 2.

Accordingly, the connection matrix calculating phase processing unit 404 executes the process, designated by the operational flowchart shown in FIG. 7.

In step 701, respective numbers of paths inputted to the THEN block and the ELSE block are detected by referring to the structure information table and the structure of the block designated by the structure information table. The number of paths inputted to the THEN block is expressed as then_path_cnt and the number of paths inputted to the else block is expressed as else_path_cnt. This process corresponds to the process 4 which is executed as part of the branch probability determining/allocating process 203 in the explanation of the principle based on FIG. 2.

Next, in step 702, the number of executions to be calculated by the following equation is allocated in the array element MATRIX (n+1, i) (i=1, ..., n) where the IP attribute is set.

The number of executions=the truth is set in the structure information table and is designated for the entire complex IF statement which is the subject of the process, in accordance with an optimization designating statement.

Sequentially, in step 703, the number of executions to be calculated by the following equation is allocated in the array element MATRIX (n+2, i) (i=1, ..., n) in which the IP attribute is set.

The number of executions=(100−the truth ratio)/else_path_cnt.

The above-described steps 702 and 703 correspond to process 5 which can be executed as a part of the branch probability determining/allocating process 203 in the explanation of the principle based on FIG. 2. As a result, the array MATRIX (n+2, n) corresponding to the connection matrix shown in FIG. 9B can be obtained.

Sequentially, in step 704, the following steps 704-1 to 704-4 are executed for the column in which the IP attribute does not exist and the IS attribute exists, namely, for a block in which the number of executions of all the paths outputted from the block to the other succeeding blocks is allocated.

In step 704-1, the sum of the numbers of respective executions sum_cnt is calculated for elements in which the numbers of the executions are stored, along the column. For example, with regard to the column E shown in FIG. 9B, the sum_cnt=20+20=40.

In step 704-2, the number of elements which have the IS attribute along the column is calculated as element_cnt. For example, with regard to the column E shown in FIG. 9B, the element_cnt=1.

In step 704-3, the value of element (the number of executions) which have the IS attribute along the column is calculated based on the following equation and is allocated for the element.

The number of executions=sum_cnt/element_cnt.

For example, in FIG. 9B, the number of executions 40 is allocated for the element (D,E).

In step 704-4, the number of executions calculated in step 704-3 are allocated for a diagonal element of the element in which the process of step 704-3 is executed. For example, in FIG. 9B, the number of executions 40 which is equal to the number of executions allocated for the element (D, E) is allocated for the diagonal element (E, D) of the element (D, E). The diagonal element always has the IP attribute.

The process of the above described step 704 corresponds to the process 6 which is executed as a part of the branch probability determining/allocating process 203 in the explanation of the principle by referring to FIG. 2.

Figures 9C, 9D:
FIG. 9C shows a third view of the example of the connection matrix.
FIG. 9D shows a fourth view of the example of the connection matrix.

In step 705, the process of the step 704 is repeated until all the elements having the IP attribute or IS attribute do not exist. As a result, the array MATRIX (n+2, n) corresponding to the connection matrix shown in FIG. 9C is obtained. This process corresponds to the process 7 which is executed as a part of the branch probability determining/allocating process 203 in the explanation of the principle by referring to FIG. 2.

In step 706, only the value of the array element in which the IP attribute is originally allocated is left and the value of the array element at which the IS attribute is originally allocated is deleted. As a result, array MATRIX (n+2, n) corresponding to the connection matrix shown in FIG. 9D, is obtained. The connection matrix corresponds to the flow graph 204b shown in FIG. 2.

Finally, in step 707, the value obtained by dividing respective values of the elements by the sum of the values of the elements along the column is allocated for the respective elements of each of the columns. The value of each element shows the branch probability of the path from the block corresponding to the column in which the element is included to the block corresponding to the row in which the element is included. This process corresponds to the process 8 which is executed as part of the branch probability determining/allocating process 203 in the explanation of the principle of the present invention by referring to FIG. 2.

The above described connection matrix calculation phase processing unit 404 enables the branch probabilities to be determined for the respective branch conditions in the complex IF statement including a plurality of branch conditions and also enables the precise optimization scheduling in the compilation process to be performed.

An Explanation of Other Embodiment

In the above embodiment, as shown in the program 201 of FIG. 2 for example, the values corresponding to the numbers of executions of respective paths are calculated and the branch probabilities of the respective branch conditions are assigned to the nodes corresponding to the respective branch conditions so that the whole branch probability (truth ratio=40 percent) of the complex IF statement of the statement 2 designated by the optimization designating statement of the statement 1 is satisfied.

In contrast, in FIG. 10, the example of the program is shown where the respective truth ratios are determined for the respective branch conditions of the complex IF statement.

In this case, after the complex IF statement is resolved into respective branches and marks are allocated to the respective branches, the respective truth ratios designated are allocated for respective branches.

In the program 1001 shown in FIG. 10, 0.4 is allocated as the truth ratio of the branch condition A, 0.2 as the truth ratio of the branch condition B, 0.9 as the truth ratio of the branch condition C, 0.8 as the truth ratio of the branch condition D and 0.4 as the truth ratio of the branch condition E.

What is claimed is:

1. A compilation processing method for performing a translation process for a program including at least one branch statement, using initial branch probability information for the at least one branch statement, the at least one branch statement having a plurality of branch conditions, said compilation processing method comprising the steps of:

providing nodes, with regard to a branch statement, each node being one of a branch node representative of a corresponding branch condition in the branch statement, a first basic block representative of code to be executed when a decision of the branch statement is true, and a second basic block representative of code to be executed when the decision of the branch statement is false;

creating a flow graph by determining a path from each node to each corresponding node, each path being input to one of the nodes and output from another one of the nodes; and determining final branch probability information for each path from each branch condition in the branch statement based on the flow graph, each path having corresponding branch probability information, said corresponding branch probability information indicative of a frequency that a specified path is executed such that the branch probability information for the plurality of branch conditions in the branch statement initially corresponds to the initial branch probability information for the branch statement.

2. The compilation processing method according to claim 1, further comprising:

decreasing an optimization level of the path corresponding to a selected branch condition of the plurality of branch conditions, said selected branch condition being estimated as having a low execution frequency based on the determined branch probability information determined for said corresponding path.

3. A compilation processing method for performing a translation process for a program including at least one branch statement, using initial branch probability information for the at least one branch statement, the at least one branch statement having branch conditions, said compilation processing method comprising the steps of:

providing nodes, with regard to a branch statement, each node being one of a branch node representative of a corresponding branch condition in the branch statement, a first basic block representative of code to be executed when a decision of the branch statement is true, and a second basic block representative of code to be executed when the decision of the branch statement is false;

creating a flow graph by determining paths from each node to each corresponding node, each path being input to one of the nodes and output from another one of the nodes; and calculating final branch probabilities for the nodes, the final branch probability being calculated for each node based on a number of paths incident to the node in the flow graph, the initial branch probability of each path incident to a selected and corresponding node, each node having a corresponding branch probability for the selected and corresponding node, such that the branch probabilities of the incident paths of the nodes of said branch statement correlate to designated branch probability information for the branch statement.

4. The compilation processing method according to claim 3, further comprising:

decreasing an optimization level of a path corresponding to a selected branch condition of the branch conditions, said selected branch condition being estimated as having a low execution frequency based on the calculated branch probability information.

5. A compilation processing method for performing a translation process for a program including at least one branch statement, using initial branch probability information for the at least one branch statement, the at least one branch statement having branch conditions, said compilation processing method comprising the steps of:

provMing nodes, with regard to a branch statement, each node being one of a branch node representative of a corresponding branch condition in the branch statement, a truth condition block representative of code to be executed when a decision of the branch statement is true, and a false condition block representative of code to be executed when the decision of the branch statement is false;

creating a flow graph by determining a path from each node to each corresponding node, each path being input to one of the nodes and output from another one of the nodes; and allocating respective values corresponding to numbers of executions for the node corresponding to said truth condition block and for the node corresponding to said false condition block, respectively, each of the respective values calculated by a ratio based on the initial branch probability information designated for the branch statement;

dividing, for each respective node, the value corresponding to the number of executions allocated for the respective node by the respective number of paths input to the respective node and producing a result;

allocating the results of the respective division as the respective values corresponding to the numbers of executions of the respective paths input to the respective nodes, for the node which is the truth condition block and the node which is the false condition block;

determining a sum of the values corresponding to the numbers of executions for all of the paths incident to the respective node and allocating the sum as a corresponding value for the number of executions of the respective node;

dividing the respective values corresponding to the numbers of executions allocated for the respective node by the number of paths input to the respective node, and allocating a result of the division as the respective values corresponding to the numbers of executions of respective paths input to the node, for each of the nodes of the branch statement; and calculating a final branch probability of each respective paths of the flow graph as the final branch probability of the branch condition corresponding to the node from which the path is output, by dividing the respective values corresponding to the number of executions allocated for the respective paths by the corresponding value for the number of executions allocated for the respective node from which each respective path is output.

6. The compilation processing method according to claim 5, further comprising:

decreasing an optimization level of the path corresponding to a selected branch condition of the branch conditions estimated as having a low execution frequency based on the determined branch probability information for said corresponding path.

7. A compilation processing apparatus for performing a translation process for a program including at least one branch statement, using initial branch probability information for the at least one branch statement, the at least one branch statement defining conditional decisions, said compilation processing apparatus comprising:

information collecting phase processing means for extracting nodes, each node being one of a branch node representing respective branch conditions in a branch statement, a first basic block executed when a corresponding conditional decision in the branch statement is true and a second basic block executed when the corresponding conditional decision in the branch statement is false, each node executed in a determined order, for determining a path from each branch node to each corresponding node, and for collecting information concerning a preceding node and a succeeding node;

block connection relation data forming means for forming, based on the information collected by said information collecting phase processing means, block connection relation data having a plurality of elements, each element indicative of a corresponding connection relation between respective nodes; and block connection relation data calculating means for calculating, based on the block connection relation data, a final branch probability for each of the paths corresponding to the respective elements, as final branch probabilities of the branch conditions included by a corresponding branch node from which the respective paths are output such that the final branch probabilities correspond to designated branch probability information for the branch statement.

8. A compilation processing apparatus for performing a translation process for a program upon execution of the program, using initial branch probability information for at least one branch statement defining conditional decisions in the program, said compilation processing apparatus comprising:

information collecting phase processing means for extracting program code blocks, each program code block being one of a branch block including respective branch conditions in a branch statement, a first basic block executed when a corresponding conditional decision in the branch statement is true and a second basic block executed when the corresponding conditional decision in the branch statement is false, the program code blocks executed in a determined order, for determining paths, a path determined from each branch block to each corresponding program code block, and for collecting information concerning a preceding program code block of respective program code blocks and information concerning a succeeding block of the respective program code blocks;

block connection relation data forming means for forming, based on the information collected by said information collecting phase processing means, block connection relation data having a plurality of elements, each element indicative of a corresponding connection relation between respective program code blocks; and block connection relation data calculating means for calculating, based on the block connection relation data and the paths between the respective program code blocks, a branch probability for each of the paths corresponding to each element, as final branch probabilities of the branch conditions included by the respective program code blocks from which the paths are output such that the branch probabilities for the plurality of paths correspond to designated branch probability information for the branch statement.

9. A compilation processing apparatus for performing a translation process for a program, the program including at least one branch statement and branch probability information for the at least one branch statement, the at least one branch statement defining conditional decisions, said compilation processing apparatus comprise:

information collecting phase processing means for extracting basic blocks, each basic block being one of a first basic block including respective branch conditions in a branch statement, a second basic block executed when decision of the branch statement is true and a third basic block executed when decision of the branch statement is false, each said basic block executed in a determined order, for determining a path from each basic block to each corresponding basic block, and for collecting concerning a preceding basic block of the respective first, second and third basic blocks and information concerning a succeeding basic block of the respective first, second and third basic blocks;

block connection relation data forming means for forming, based on the information collected by said information collecting phase processing means, block connection relation data having a plurality of elements, each element indicative of a corresponding connection relation between respective basic blocks;

first block connection calculating means for allocating, in the block connection relation data, a first value corresponding to a first number of executions, by dividing a second value corresponding to a second number of executions allocated for the truth condition block, calculated based on a branch probability designated for the branch statement, by the number of elements corresponding to all the paths input to the truth condition block, each element designating one of the paths which is input to the truth condition block;

second block connection calculating means for allocating, in the block connection relation data, a third value corresponding to a third number of executions, by dividing a fourth value corresponding to a fourth number of executions allocated for the false condition block, based on the branch probability designated for the branch statement, by the number of elements corresponding to all the paths input to the false condition block, each element designating one of the paths which is input to the false condition block;

third block connection calculating means for allocating, in the block connection relation data, a fifth value corresponding to a fifth number of executions, by dividing a sum of sixth values corresponding to sixth numbers of the executions allocated for each of the respective elements corresponding to all the paths output from a selected one of the basic blocks by the number of elements representing the paths input to the selected basic block, for each element designating the path input to the selected basic block, for each of the basic blocks of the branch statement; and fourth block connection calculating means for calculating, a branch probability for each respective element of the block connection relation data, as the branch probability of the corresponding branch condition included by the basic block from which the path corresponding to each element is output by dividing a seventh value corresponding to a seventh number of executions allocated for each element by a sum of eighth values corresponding to eighth numbers of executions allocated for the elements corresponding to all of the paths output from the basic block from which the paths corresponding to the respective element are output.

10. A compilation processing method for performing a translation process for a program including at least one branch statement, using initial branch probability information for the at least one branch statement, the at least one branch statement defining a plurality of conditional decisions, said compilation processing method comprising the steps of:

creating a flow graph by resolving the plurality of conditional decisions defined by the at least one branch statement into respective conditional decisions; and determining branch probability information for each respective conditional decision in the flow graph based on the flow graph and the initial branch probability information to to obtain final branch probability information for the at least one branch statement.

11. A compilation processing method for performing a translation process for a program including at least one branch statement, using initial branch probability information for the branch statement, the branch statement defining a plurality of conditional decisions, said compilation processing method comprising the steps of:

creating a flow graph by resolving the at least one branch statement into respective conditional decisions; and allocating branch probability for each respective conditional decision in the flow graph, based on the flow graph and the initial branch probability information to to obtain final branch probability information of of the branch statement.

12. The compilation processing method according to claim 11 wherein:

said creating of a flow graph further determines paths for the conditional decisions; and said allocating of branch probability allocates branch probabilities for each path; and further comprising the steps of decreasing an optimization level of a selected path of the paths which is determined to have a low execution frequency based on a respective branch probability for the path.

13. A compilation processing apparatus for performing a translation process for a program including at least one branch statement, using initial branch probability information for the branch statement, the branch statement defining a plurality of conditional decisions, said compilation processing apparatus comprising:

information collecting phase processing means for resolving the at least one branch statement, into respective conditional decisions allocating, for each of the respective condition decisions, a succeeding basic block, and collecting information for creating a flow graph;

connection matrix creating phase processing means for creating a connection matrix representing the flow graph designating connection relations relating to branch nodes and succeeding basic blocks, based on the collected information; and connection matrix calculating phase processing means for calculating a ratio of a number of executions in accordance with the number of paths from the succeeding basic block to one of the branch nodes, based on the initial branch probability information by referring to the created connection matrix, and allocating respective branch probability information for each of the respective conditional decisions.

* * * * *

UNITED STATES PATENT AND TRADEMARK OFFICE
CERTIFICATE OF CORRECTION

PATENT NO. : 5,742,803

DATED : April 21, 1998

INVENTOR(S) : Igarashi et al.

It is certified that error appears in the above-identified patent and that said Letters Patent is hereby corrected as shown below:

Col. 1, line 29, delete "has been recently noted";

line 52, delete ",";

line 53, "instructions" should be --instructions,--;

line 63, "program the" should be --program. The--;

line 66, "appears" should be --appears,--;

line 67, "similarly" should be --Similarly--.

Col. 2, line 22, "occurs" should be --occurs,--.

Col. 3, line 54, "invention" should be --invention,--;

Col. 4, line 40, after "view of" insert --one--.

Col. 5, line 28, "branched" should be --branched;--;

line 38, "Instead" should be --Instead,--;

line 57, "Consequently" should be --Consequently,--.

UNITED STATES PATENT AND TRADEMARK OFFICE
CERTIFICATE OF CORRECTION

PATENT NO. : 5,742,803
DATED : April 21, 1998
INVENTOR(S) : Igarashi et al.

It is certified that error appears in the above-identified patent and that said Letters Patent is hereby corrected as shown below:

Col. 6, line 17, "Similarly" should be --Similarly,--;
line 22, after "Similarly" insert --the--;
line 38, "E," should be --E. The--.

Col. 7, line 34, delete ", respectively";
line 38, "However" should be --However,--.

Col. 10, line 18, after "truth" insert --ratio/then _path_cnt. where the truth ratio--.

Col. 14, line 67, "comprise" should be --comprising--.

Col. 16, line 13, delete "to" (first occurrence);
line 26, delete "to".

Signed and Sealed this

Fifteenth Day of September, 1998

Attest: .

Attesting Officer

BRUCE LEHMAN

Commissioner of Patents and Trademarks